(12) United States Patent
Wu et al.

(10) Patent No.: US 9,735,449 B2
(45) Date of Patent: Aug. 15, 2017

(54) ELECTROLYTE COMPOSITION

(71) Applicant: ETERNAL MATERIALS CO., LTD., Koahsiung (TW)

(72) Inventors: Ting-Yuan Wu, Kaohsiung (TW); Yu-Wei Chang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 14/672,738

(22) Filed: Mar. 30, 2015

(65) Prior Publication Data

US 2015/0280286 A1    Oct. 1, 2015

Related U.S. Application Data

(60) Provisional application No. 61/972,525, filed on Mar. 31, 2014.

(51) Int. Cl.
| | |
|---|---|
| *H01M 10/08* | (2006.01) |
| *H01M 10/0567* | (2010.01) |
| *C01B 31/04* | (2006.01) |

(52) U.S. Cl.
CPC ......... *H01M 10/08* (2013.01); *C01B 31/0438* (2013.01); *H01M 10/0567* (2013.01); *H01M 2300/0011* (2013.01); *H01M 2300/0091* (2013.01)

(58) Field of Classification Search
CPC ........ H01M 6/16; H01M 6/162; H01M 6/168; H01M 10/0567; H01M 10/08; H01M 2300/0011; H01M 2300/0091
See application file for complete search history.

(56) References Cited

U.S. PATENT DOCUMENTS

| | | | | |
|---|---|---|---|---|
| 8,927,658 | B2 * | 1/2015 | Imae ................. | C08K 3/20 |
| | | | | 428/220 |
| 2005/0181282 | A1 | 8/2005 | Niu | |
| 2011/0027628 | A1 * | 2/2011 | Deane et al. ............. | 429/50 |
| 2011/0133607 | A1 * | 6/2011 | Lee .................. | H01L 41/193 |
| | | | | 310/365 |
| 2011/0318614 | A1 * | 12/2011 | Takeshi et al. .......... | 429/50 |
| 2012/0261612 | A1 | 10/2012 | Suh et al. | |
| 2012/0328940 | A1 | 12/2012 | Bosnyak et al. | |
| 2012/0330044 | A1 * | 12/2012 | Hou ................ | 556/9 |
| 2013/0065154 | A1 | 3/2013 | Lee | |
| 2015/0021631 | A1 * | 1/2015 | Huh et al. .............. | 257/88 |
| 2015/0174532 | A1 * | 6/2015 | Wilson ............... | B01D 59/14 |
| | | | | 210/640 |

FOREIGN PATENT DOCUMENTS

| | | | |
|---|---|---|---|
| CN | 1505186 | A | 6/2004 |
| CN | 10179563 | A | 6/2010 |
| CN | 102201575 | A | 9/2011 |
| JP | 2002-343412 | A | 11/2002 |
| JP | 2006-128056 | A | 5/2006 |
| JP | 2013-514963 | A | 5/2013 |
| JP | 2013/258129 | A | 12/2013 |
| KR | 10-2007-0122430 | A | 12/2007 |
| KR | 10-2010-0117570 | A | 11/2010 |
| KR | 10-2013-0020184 | A | 2/2013 |
| RU | 2 422 563 | C1 * | 6/2011 |

OTHER PUBLICATIONS

Google translation of RU 2 422 563 C1, published on Jun. 27, 2011.*
Espacenet English abstract of CN 102201575 A.
Espacenet English abstract of CN 10179563 A.
Espacenet English abstract of CN 1505186 A.
Non-English Japanese Action dated Mar. 14, 2015 for Japanese Application No. 2015-068541 with English translation.
Non-English Korean Action dated Apr. 21, 2016 for Korean Application No. 10-2015-0044873 with English translation.
Patent Abstracts of Japan English abstract of JP 2013/258129 A.
Patent Abstracts of Japan English abstract of JP 2006-128056 A.
Patent Abstracts of Japan English abstract of JP 2002-343412 A.
Espacenet English abstract of KR 10-2013-0020184 A.
Espacenet English abstract of KR 10-2007-0122430 A.
Espacenet English abstract of KR 10-2010-0117570 A.

* cited by examiner

*Primary Examiner* — Anca Eoff
(74) *Attorney, Agent, or Firm* — Ladas & Parry LLP

(57) ABSTRACT

An electrolyte composition and a battery is provided. The electrolyte composition includes graphene. The electrolyte composition of the present invention is suitable for a battery and can improve the life cycle of the battery. The application process of the electrolyte composition of the present invention is simple and more cost-efficient as compared to conventional techniques which add carbon material(s) to a battery. The present invention is effective in improving battery performance.

8 Claims, 3 Drawing Sheets

ELECTROLYTE COMPOSITION

FIELD OF THE INVENTION

The present invention relates to a novel electrolyte composition and a battery, particularly a novel graphene-containing electrolyte composition useful for a battery.

BACKGROUND OF THE INVENTION

Generally, batteries can be divided into chemical batteries and physical batteries, and chemical batteries can further be divided into primary batteries, secondary batteries and fuel batteries.

Secondary batteries, also known as rechargeable batteries, are charged/recharged by applying an electric current, which reverses the chemical reactions that occur during discharge/use. Common secondary batteries include nickel metal hydride battery (NiMH battery or nickel hydride battery), lead-acid battery and lithium ion battery. The lead-acid battery, though the oldest form of secondary batteries, still remains popular for its good reliability, low cost for manufacture and purchase, and high regeneration rate.

A conventional lead-acid battery comprises a negative electrode of metallic lead, a positive electrode of lead dioxide, and a diluent sulfuric acid electrolyte. The chemical reactions during battery discharge are indicated below:

Reaction at the negative electrode:

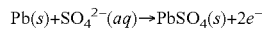
$Pb(s) + SO_4^{2-}(aq) \rightarrow PbSO_4(s) + 2e^-$

Reaction at the positive electrode:

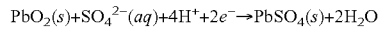
$PbO_2(s) + SO_4^{2-}(aq) + 4H^+ + 2e^- \rightarrow PbSO_4(s) + 2H_2O$ As the lead-acid battery discharges, electrons are released from the negative electrode and the resulting lead ions ($Pb^{2+}$) immediately react with sulfate ions ($SO_4^{2-}$) and form insoluble lead sulfate ($PbSO_4$) crystals adsorbed on the surface of the negative electrode. At the positive electrode, electrons from the external circuit reduce $PbO_2$ to $Pb^{2+}$, which also react with $SO_4^{2-}$ and form $PbSO_4$ crystals adsorbed on the positive electrode. By applying an opposite voltage, reverse chemical reactions occur and then the battery recharges.

In practice, the lead sulfate formed on the electrodes cannot be completely converted to lead ions and sulfate ions during the recharge cycles, and therefore the amount of the sulfate ions in the electrolyte will gradually decrease. This problem would become more severe when a coarse lead sulfate cluster forms due to deep discharge or rapid recharge of the battery. The residual lead sulfate degrades the cooling rate of the electrodes and reduces the effective surface area of the Pb and $PbO_2$ electrodes, thereby reducing the capacity and life cycle of the battery. Another problem is water loss due to gas evolution, which happens when the water contained in an electrolyte solution is electrolyzed during deep discharge or rapid recharge/charge of the battery or is evaporated due to heat accumulated in the battery. The water loss makes it harder to dissolve lead sulfate; the oxygen and hydrogen produced during the electrolysis of water jeopardizes the safety of the battery. Furthermore, the presence of sulfuric acid concentration gradient increases the internal resistance of the battery, decreases the mobility of the ions, and thus adversely affects the performance of the battery.

Therefore, improvements addressing the above mentioned problems have been sought for a long time.

In order to solve the above problems, various battery additives have been employed to modify the electrodes, especially additives of carbon material, such as carbon black, activated carbon, carbon nanotubes and graphene. For example, CN 102201575 discloses a lead sulfate-graphene composite electrode material and a negative paste comprising the same; CN 101719563 discloses a lead-acid battery with graphene added to the negative electrode; US 20120328940 A1 discloses the use of carbon nanotubes or graphene as an additive in the electrodes; CN 1505186 and US 2005181282 disclose use of carbon nanotubes for the cathode and anode of lead-acid batteries. It is believed that using carbon nanotubes and/or graphene in the electrodes can improve the properties of the lead-acid battery.

Much effort has been directed to the use of the above-mentioned carbon material, especially carbon nanotubes and/or graphene, in battery electrodes, but it still cannot effectively improve the problem of polarization caused by the sulfuric acid concentration gradient. Moreover, in the conventional processes for preparing modified electrodes with carbon material, a higher amount of carbon material (about 5 wt % based on the total weight of the lead paste) is required and the processes generally involve complicated steps and therefore involve higher cost. It is thus still necessary to develop a cheaper and simpler approach to provide a battery with improved performance.

SUMMARY OF THE INVENTION

The present invention provides an electrolyte composition and a battery to solve the above problems.

It is an object of the present invention to develop an electrolyte composition containing graphene.

In another aspect, the present invention provides a battery comprising the electrolyte composition.

By adding graphene to the electrolyte composition, the present invention can effectively improve the performance of a battery.

DETAILED DESCRIPTION OF THE INVENTION

Figure 1:
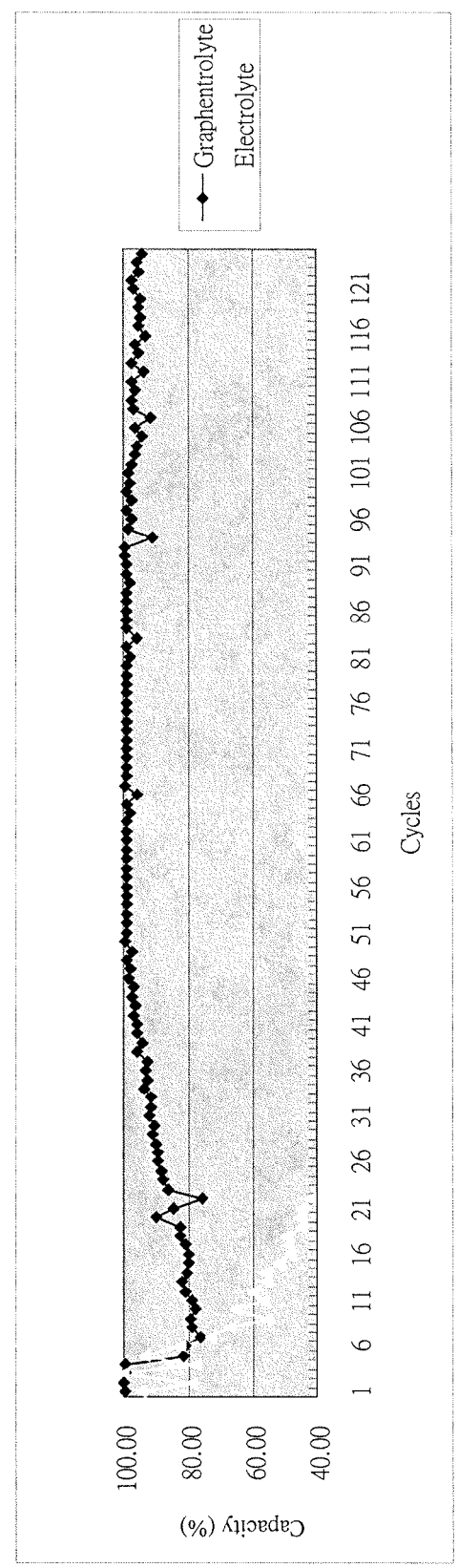
FIG. 1 shows capacity change measured after charge/discharge cycles for the unit cells using a conventional electrolyte composition and the electrolyte composition according to the present invention.

In order to understand the contents disclosed hereinafter, definitions of several terms are provided below.

The word "about" is used to describe and account for an acceptable deviation for a certain value measured by a person of ordinary skill in the art. The range of the deviation depends on how the value is measured.

In one embodiment, the present invention provides a graphene-containing electrolyte composition.

Graphene is a 2-dimensional, crystalline allotrope of carbon. In graphene, carbon atoms are densely packed in a regular $sp^2$-bonded hexagonal pattern. Graphene includes single-layer graphene and multilayer graphene. Single-layer graphene refers to a sheet of one atomic layer of carbon molecules having π bonds.

The inventors of the present invention found that the performance of a battery, especially a lead-acid battery, can be effectively enhanced by adding graphene to an electrolyte composition of the battery. As compared with carbon nanotubes, graphene has superior thermal conductivity, electric conductivity and specific surface area and is more soluble in an aqueous solution and suitable for large-scale production. The inventors of the present invention further found that when applied to an electrolyte composition, the superior thermal conductivity and electric conductivity of graphene can effectively reduce the water loss due to gas evolution during the operation of a battery, which results in improved performance of a battery. Moreover, the sulfuric acid concentration gradient can be effectively reduced by adding graphene to an electrolyte composition, thereby increasing the mobility of sulfate ions, decreasing the internal resistance due to the sulfuric acid concentration gradient and enhancing the battery performance; the high specific surface area of graphene and the decrease of the sulfuric acid concentration gradient decrease the size of the lead sulfate cluster formed on the electrodes of lead-acid battery and thus can improve the properties of the electrodes.

In another embodiment, the present invention provides an electrolyte composition comprising (1) water, (2) sulfuric acid and (3) graphene. In the present invention, the graphene is present in an amount of about 0.001 to about 1 wt %, preferably about 0.003 to about 0.2 wt %, most preferably about 0.005 to about 0.1 wt %, based on the total weight of the electrolyte composition. An excessive amount of graphene (for example, >1 wt %) may cause a short circuit. In the presence of an insufficient amount of graphene (for example, <0.001 wt %), the distribution of the concentration of the electrolyte composition would be uneven such that it is liable to cause polarization and increase the resistance of the electrolyte composition, which would adversely affect battery performance. Preferably, the electrolyte composition of the present invention has a specific gravity from about 1.12 to about 1.28.

The amount of sulfuric acid in the electrolyte composition is not particularly limited and can be any suitable amount known to a person of ordinary skill in the art or adjusted by a person of ordinary skill in the art as needed. In one embodiment of the present invention, the sulfuric acid is present in an amount of about 10 to about 75 wt %, preferably about 12 to about 45 wt %, most preferably about 15 to about 40 wt %, based on the total weight of the electrolyte composition.

It is found that introducing graphene to the electrolyte composition can remarkably decrease the resistance of the electrolyte composition. A conventional electrolyte composition usually has a resistance over 600Ω while the electrolyte composition of the present invention has a resistance of no greater than 600Ω. The decrease of resistance can improve the capacity efficiency during deep discharge or rapid recharge/charge of the battery, and thus can enhance battery performance. The preferable resistance is in the range of 100 to 600Ω

The graphene useful to the present invention can be prepared through any suitable process, for example, the conventional processes including mechanical exfoliation, epitaxial growth, chemical vapor deposition (CVD), liquid phase exfoliation and high temperature furnace carbonization. Among the conventional processes, liquid-phase exfoliation of bulk graphite is considered an up-scalable approach to obtain high-quality single layer graphene with equipment available in chemistry labs.

Preferably, the graphene of the present invention is a thin graphene flake or sheet. If the graphene size is too large, graphene may precipitate due to insufficient buoyant force, which may cause a partial short circuit. In a preferred embodiment, the graphene of the present invention has a lateral dimension from about 20 nm to about 1 μM and a thickness from about 0.35 nm to about 10 nm.

In a preferred embodiment, the graphene useful to the present invention is modified with functional groups, to improve the properties of the graphene. For example, the graphene can be optionally modified with hydrophilic groups so as to provide an improved dispersibility, which prevents graphene from precipitating, aggregating, or suspending at the surface of the electrolyte, and prevents the demixing of the electrolyte composition. Examples of the hydrophilic groups include, but are not limited to, hydroxyl group (—OH), amino group (—$NH_2$), carboxyl group, carbonyl group and phosphate group. Preferably, the graphene useful to the present invention is modified with a hydroxyl group (—OH) or an amino group (—$NH_2$).

The modified graphene useful to the present application can be prepared by any suitable process, including but not limited to liquid-phase exfoliation.

In a preferred embodiment, the modified graphene useful to the present application has a carbon content of more than about 80 mol % and an oxygen content from about 1 mol % to about 20 mol %. If the carbon content is too low (e.g., less than about 80 mol %), conductivity may decrease. If the oxygen content is too low (e.g., less than about 1 mol %), the wettability of modified graphene is worse and the conductivity may decrease. If the oxygen content is too high (e.g., more than about 20 mol %), the conductivity may decrease.

The electrolyte composition of the present invention can optionally comprise any suitable additives that are known to a person of ordinary skill in the art, for example, those added to an electrolyte composition to improve the disadvantages, such as high internal resistance, low capacity or demixing of the electrolyte composition, or those added to increase battery life. Examples of the additives commonly used in the art include, but are not limited to, sulfates containing alkali metal or alkaline earth metal, phosphoric acid, cobalt sulfate, cadmium sulfate, tin sulfate, copper sulfate, zinc sulfate, nickel sulfate, aluminum sulfate, sodium carbonate, potassium hydroxide or sodium hydroxide, fumed silica, or silica (silicon dioxide). Adding sodium carbonate, potassium hydroxide, sodium hydroxide or silicon dioxide to the electrolyte composition is beneficial for maintaining the uniformity of the sulfuric acid concentration, reducing polarization, enhancing the sustainability of the graphene and increasing battery life for a lead-acid battery; silicon dioxide is preferred. The amount of the additives is not particularly limited and can be adjusted by a person of ordinary skill in the art as needed. In an embodiment of the present invention, the amount of the additives can be about 0.01 to about 10 wt %, preferably about 0.1 to about 5 wt %, based on the total weight of the electrolyte composition.

The electrolyte composition of the present invention can be applied to any suitable field. In a preferred embodiment, the electrolyte composition of the present invention is used in a battery, preferably in a lead-acid battery.

The present invention further provides a battery comprising the above electrolyte composition, which can be, but is not limited to, a nickel hydride battery, lead-acid battery, lithium ion battery or dye-sensitized solar cell.

It is found that a portion of graphene in the electrolyte composition of the present invention would adsorb on the surface of the positive and negative electrodes of the battery after appropriate charge/discharge cycles. Because of graphene adsorption, the conductivity of the negative electrode increases and the negative electrode forms into a graphene-containing electrode with a special crystalline structure, which reduces the amount of lead sulfate accumulated on the negative electrode; the graphene adsorbed on the positive electrode prevents the positive electrode from losing its electrode structure. Consequently, the life cycle of the battery can be increased.

As compared with conventional techniques, the present invention provides one or more of the following advantages:

(1) Improved conductivity of the electrolyte composition:
   It is found that the electrolyte composition of the present invention increases the mobility of $SO_4^{2-}$ ions, reduces the sulfuric acid concentration gradient, and thus improves the performance of the battery.
(2) Improved cooling rate of the electrolyte composition due to excellent thermal conductivity of graphene:
   Since the cooling rate of the electrolyte composition is improved, the water loss due to electrolysis or evaporation can be reduced, and thus, the sulfuric acid concentration can be retained for a longer period, i.e., increased battery life can be achieved.
(3) Improved conductivity/cooling rate of the electrodes:
   During battery discharge or recharge, some of the graphene in the electrolyte composition of the present invention is adsorbed on the surfaces of the electrodes. The adsorbed graphene not only improves the cooling rate of the electrodes but also suppresses the growth of lead sulfate crystals on the electrodes, thereby maintaining the efficiency of the electrodes and preventing corrosion of the positive electrode.
(4) Improved life cycle of the battery:
   It is found that with the electrolyte composition of the present invention, the life cycle of the battery can be improved to, for example, at least 2 times longer than that of a battery using an electrolyte composition without graphene.
(5) Reduced manufacturing cost:
   As compared with conventional processes for preparing modified electrodes with carbon material, the electrolyte composition of the present invention requires less graphene but achieves superior effects, including enhancing battery performance. In addition, the electrolyte composition of the present invention can be directly used in the preparation of a battery or a graphene-containing electrode, unlike the conventional process for preparing a graphene-containing electrode, which requires a series of complicated steps. Given the above, with the electrolyte composition of present invention, the manufacturing cost of a battery can be reduced while maintaining similar or superior efficacy.

The electrolyte composition of the present invention comprises a electrolyte composition containing graphene. Due to the above advantages (2) and (3), the surface temperature of the unit cell in which an electrolyte composition of the present invention is used would be lower (for example, about 2-5° C.) than that of the unit cell in which a traditional electrolyte (i.e., without graphene) is used, after a lot of charge/discharge cycles. In addition, the temperature difference between the electrolyte solution and the electrode of the latter unit cell is greater than that of the former unit cell. Thus, the electrolyte composition containing graphene can improve the overheating of the battery and prevents the electrodes from deterioration.

Not limited to the application illustrated above, it is believed that the electrolyte composition of the present invention can be used in any possible applications. It would be obvious to persons of ordinary skill in the art that various other changes and modifications can be made without departing from the concept of the present invention.

EXAMPLES

Example 1

Two lead-acid battery unit cells with a traditional electrolyte solution were provided (NP 2V4Ah; Tai Mao Battery Co., Ltd.). 500 ppm graphene was added into the electrolyte solution in one of the unit cells ("Graphenetrolyte") while no graphene was added into the other one of the unit cells ("Electrolyte").

The unit cells were subjected to a charge/discharge cycling test. Each of the unit cells was rapidly charged at a ratio of 0.2 C (i.e., 800 mA/hour) to 95% or above of its rated capacity and then discharged at a rate of 0.2 C to 80% DOD (depth of discharge). The capacity (%) of the unit cells was measured after each cycle and the results are shown in FIG. 1. The term "DOD (depth of discharge)" in the present invention refers to the ratio of the capacity removed from a cell during discharge to the rated capacity of the cell. The capacity of a cell will be reduced after repeated charged and discharged; in general, the cell is "dead" when its capacity is lower than 50%.

In view of FIG. 1, it is found that the life cycle of the unit cell was notably improved with graphene added to the electrolyte solution as compared to the one without graphene added.

[1 mg/kg=ppm; 0.1 wt % =1000 ppm]

Example 2

The positive and negative electrodes of the two unit cells in Example 1 were observed with a scanning electron microscope (SEM; Hitachi S-3400N) after 30 charge/discharge cycles. The results are shown in FIG. 2.

Figure 2:
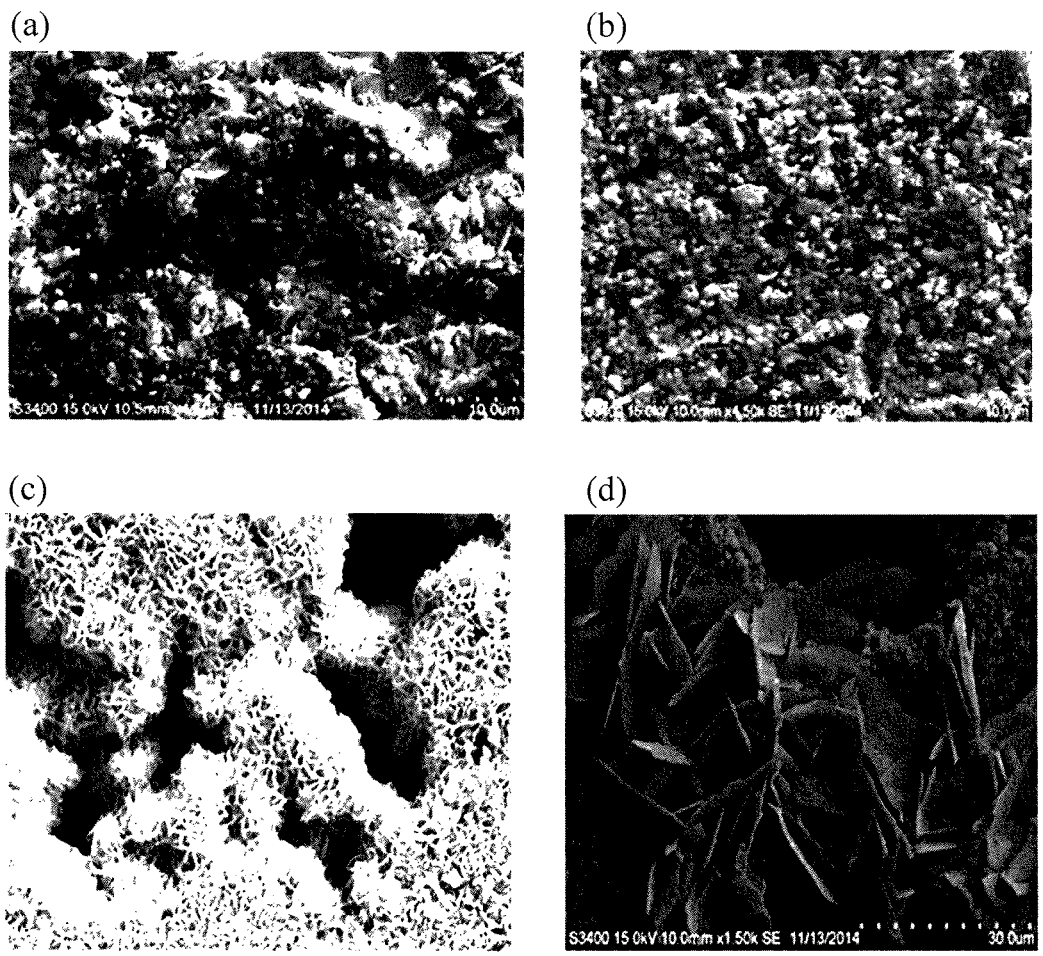
FIG. 2 shows SEM images of the positive and negative electrodes of the unit cells using a conventional electrolyte composition and the electrolyte composition according to the present invention.

In FIG. 2, (a) and (b) respectively show images of the positive and negative electrodes of the unit cell containing a traditional electrolyte solution ("Electrolyte"; no graphene); (c) and (d) respectively show images of the positive and negative electrodes of the unit cell containing an electrolyte solution of the present invention ("Graphenetrolyte"; with graphene). The carbon content was measured by EDAX (Energy Dispersive Analysis of X-rays); the results show that the carbon contents in (a) and (b) are zero and the carbon contents in (c) and (d) are 8.6 mol % and 3.4 mol %, respectively. In view of the above, after appropriate charge/discharge cycles, graphene in the electrolyte composition of the present invention was adsorbed on the surface of the positive and negative electrodes and thus graphene-containing electrodes were formed.

Furthermore, as shown in FIGS. 2 (a) and (b), sulfates were adsorbed on the surface of the positive and negative electrodes of the unit cell in which a traditional electrolyte solution was used. Comparing FIGS. 2 (c) and (d) with FIGS. 2 (a) and (b), it can be seen that graphene is adsorbed on the positive and negative electrodes when the electrolyte composition of the present invention is used, which suppresses the growth of large lead sulfate crystals on the positive and negative electrodes and increases the thermal conduction efficiency of the electrodes, effectively increasing the life cycle of the lead-acid battery.

Example 3

Four lead-acid battery unit cells (NP 2V4Ah; Tai Mao Battery Co., Ltd.) were provided. Graphene was added in an amount of 50 ppm, 150 ppm and 500 ppm, respectively, into the electrolyte solution for three of the unit cells. The remaining unit cell contained no added graphene. The unit cells were subjected to a charge/discharge cycling test with 100% DOD (depth of discharge). The capacity (%) of the unit cells was measured after each cycle and the results are shown in FIG. 3.

Figure 3:
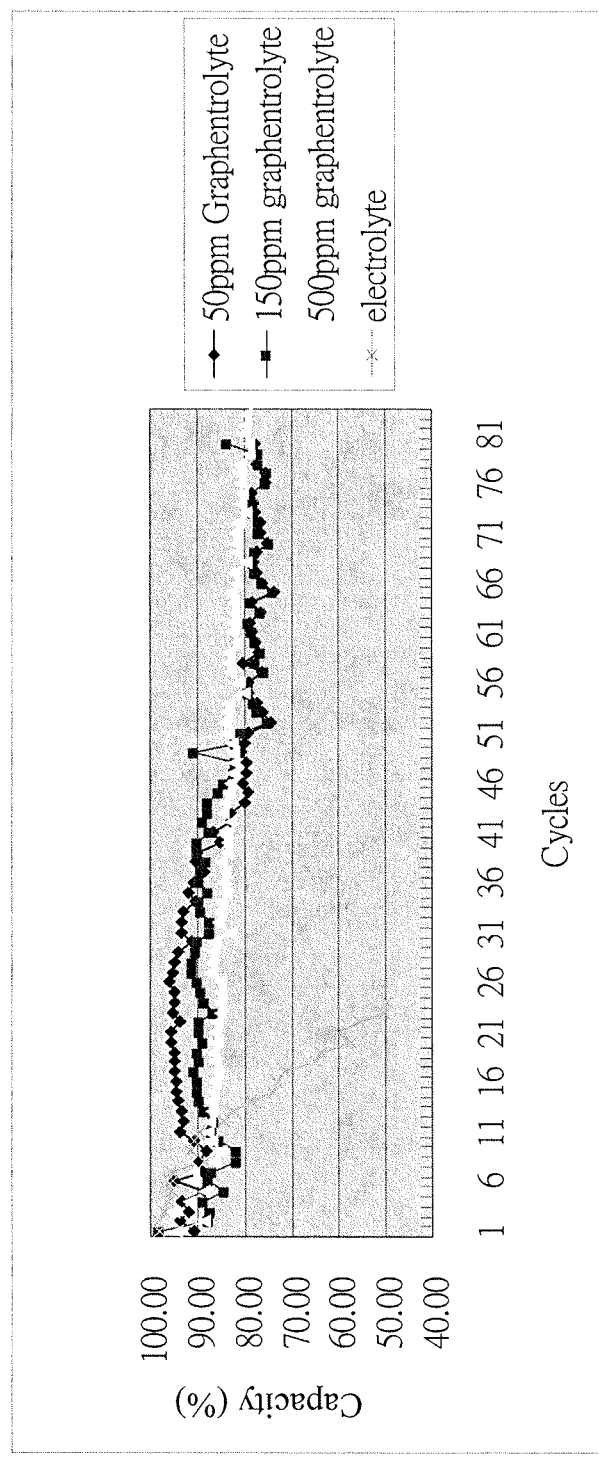
FIG. 3 shows capacity change measured after charge/discharge cycles for the unit cells in which an electrolyte composition with a different concentration of graphene was used.

In view of FIG. 3, as compared to the electrolyte solution containing no added graphene ("Electrolyte"), the electrolyte solutions containing graphene ("50 ppm Graphenetrolyte," "150 ppm Graphenetrolyte" and "500 ppm Graphenetrolyte") notably increased the life cycle of the unit cells.

Example 4

Electrolyte solutions containing 0 ppm, 50 ppm, 150 ppm, 500 ppm, 1000 ppm, 2000 ppm graphene, respectively, were prepared. A ohmmeter (FLUKE 87V) was used to measure the resistance of each of the electrolyte solutions. The two electrodes of the ohmmeter immersed fully in the electrolyte solutions with a distance of 10 cm. The results are showed in Table 1:

TABLE 1

| | Concentration of graphene | | | | | |
|---|---|---|---|---|---|---|
| | 0 ppm | 50 ppm | 150 ppm | 500 ppm | 1000 ppm | 2000 ppm |
| specific gravity | 1.25 | 1.25 | 1.26 | 1.26 | 1.26 | 1.26 |

TABLE 1-continued

| | Concentration of graphene | | | | | |
|---|---|---|---|---|---|---|
| | 0 ppm | 50 ppm | 150 ppm | 500 ppm | 1000 ppm | 2000 ppm |
| Resistance ($\Omega$) | 647 | 507 | 468 | 436 | 407 | 382 |

In view of Table 1, when the amount of graphene increases, the resistance of the electrolyte solution reduces.

What is claimed:

1. An electrolyte composition comprising water, sulfuric acid and graphene, wherein graphene is present in an amount of about 0.001 wt % to about 1 wt % based on the total weight of the electrolyte composition and is modified with hydrophilic groups, wherein the modified graphene has a lateral dimension from 20 nm to 1 μm and a thickness from 0.35 nm to 10 nm.

2. The electrolyte composition according to claim 1 wherein hydrophilic groups are selected from the group consisting of hydroxyl group, amino group, carboxyl group, carbonyl group, phosphate group and a combination thereof.

3. The electrolyte composition according to claim 1 wherein the modified graphene has a carbon content of more than about 80 mol % and an oxygen content from about 1 mol % to about 20 mol %.

4. The electrolyte composition according to claim 1, having a specific gravity from about 1.12 to about 1.28.

5. The electrolyte composition according to claim 1, having a resistance of no greater than 600Ω.

6. The electrolyte composition according to claim 5, having a resistance of 100 to 600Ω.

7. A method comprising incorporating the electrolyte composition according to claim 1 in a lead-acid battery.

8. A battery comprising the electrolyte composition of claim 1.

* * * * *